Jan. 19, 1971 R. F. AMLIE 3,556,860
STORAGE BATTERY AND ELECTROLYTE PRECURSOR THEREFOR
Filed Feb. 17, 1969 2 Sheets-Sheet 1

Inventor
Robert F. Amlie
by: Pendleton, Neuman
Seibold & Williams
Atty's

Jan. 19, 1971  R. F. AMLIE  3,556,860
STORAGE BATTERY AND ELECTROLYTE PRECURSOR THEREFOR
Filed Feb. 17, 1969  2 Sheets-Sheet 2

Inventor
Robert F. Amlie
Pendleton, Neuman
by Seibold & Williams
Atty's though a commercial embodiment of the invention

United States Patent Office 3,556,860  
Patented Jan. 19, 1971

3,556,860
STORAGE BATTERY AND ELECTROLYTE PRECURSOR THEREFOR
Robert F. Amlie, Milwaukee, Wis., assignor to Globe-Union Inc., Milwaukee, Wis., a corporation of Delaware
Filed Feb. 17, 1969, Ser. No. 799,679
Int. Cl. H01m 9/00
U.S. Cl. 136—157            9 Claims

ABSTRACT OF THE DISCLOSURE

A gelled sulfuric acid composition for forming a battery electrolyte which contains either the oxyacids or oxides of boron and phosphorous as gelling agents, lead acid batteries containing such electrolytes formed from the gel, and methods for preparing the same. The invention also relates to battery constructions which utilize gelled sulfuric acid in the formation of electrolytes in dry charged batteries for on-the-site preparations of ready-to-use dry charged lead-acid batteries.

BACKGROUND OF THE INVENTION

Dry charged batteries of the sulfuric acid-lead type are known. Such batteries require the addition of a sulfuric acid electrolyte at the point of use. This on-the-site addition of sulfuric acid electrolyte requires the separate storage of electrolyte at the point of use as well as handling of sulfuric acid by personnel at the time of battery installation for a customer. Sulfuric acid obviously presents a hazard in handling. Furthermore, the costs associated with the transportation of sulfuric acid are high due to the fact that a substantial proportion of the electrolyte is water. Another problem associated with dry charge batteries is that the negative plates frequently contain a small amount of residual moisture and this moisture on storage contributes to a loss in capacity over a period of time, the alleviation of which problem is an object of this invention. A further problem that is connected with conventional dry charge batteries is that on initial activation by addition of electrolyte, the battery frequently exhibits a passivity in that it will not readily accept a charge in use at temperatures of from 0 to 30° F. Battery manufacturers recognize the problem and generally recommend a booster charge before installation of the battery in an automobile. Another object of this invention is the provision of a dry charge battery electrolyte system which would eliminate this difficulty. A most desirable object would be the formation of a dry charge lead-acid battery which would contain a concentrated sulfuric acid composition within the battery case which would permit the formation of a charged battery by merely adding water to the battery at the time of and at the site of installation without the necessity of handling the sulfuric acid by a station operator at any time.

BRIEF DESCRIPTION OF PRIOR ART

The prior art describes the manufacture of various gelled sulfuric acid for use in the forming of electrolytes for use in lead-acid batteries. For example, United States Pat. No. 3,067,275 describes a sulfuric acid gel used in lead-acid type storage batteries of the conventional type and of the dry charged type. This gel is made by the addition of aluminum sulfate to concentrated sulfuric acid. The gel is maintained in the upper part of the cell above the plates and below the point where water is added. The dry charged cell is made ready for use by the addition of water to the battery, and forming a sulfuric acid solution of the desired specific gravity, e.g., about 1.250. Some of the disadvantages associated with this system are that aluminum sulfate dissolved in the electrolyte after activation results in a poor high rate discharge characteristic and the common ion effect reduces the solubility of $PbSO_4$ in the electrolyte which is detrimental to recharging of the battery.

Gelled electrolytes have also been made by using silica as the immobilizing agent in U.S. Pat. No. 3,408,233 and British Pat. No. 785,848. The amount of silica required to properly immobilize the gel is quite large and in fact, practically uneconomic. Furthermore, the resulting gel is very slow to release the acid upon mixture with water.

Leicester, in the J. Soc. Chem. Ind. (London) 67, 433–4 (1948), describes the formation of a gelled sulfuric acid using mixtures of boric acid and phosphoric acid. Equimolar proportions of the boric and phosphoric acids are said to provide the best gels although 30% excess of both acids were tried. The gelling action is ascribed to a boron phosphate, $BPO_4$, compound of complex formed in situ. Mole ratios of this postulated compound to sulfuric acid of from 1 to 10 to 1 to 400 are described with firm gels being obtained at the higher concentrations, i.e., ratios of 1 to 200 of compound to sulfuric acid. It is stated that with increasing water content in the sulfuric acid, the gelling time decreased rapidly. All of the gells disclosed by Leicester exhbiit syneresis (separation of concentrated sulfuric acid from the gel) at elevated temperatures or on extended standing at room temperature. Stability of the gels is important in battery use, and any appreciable syneresis cannot be tolerated since the concentrated sulfuric acid exudate will destroy and degrade the plates and separators of a battery on contact.

SUMMARY OF THE INVENTION

In one broad form, the present invention comprises a sulfuric acid gel formed by the incorporation into sulfuric acid of the reaction product of the oxides of boron and phosphorous. The sulfuric acid utilized in the invention is a concentrated sulfuric acid, or more specifically, having a concentration of at least about 95% $H_2SO_4$, preferably at least 96% and most preferably 98% or above. The invention also includes the gelation of fuming sulfuric acid containing free oleum or $SO_3$, more particularly up to 30% oleum or free sulfur trioxide. The concentration of the acid can also be stated in terms of sulfur trioxide, 98% sulfuric acid corresponding to 80% $SO_3$ up to the so-called 30% oleum or sulfuric acid containing 87% $SO_3$ which has an $H_2SO_4$ equivalent percent of 106.75.

The mechanism responsible for the gelling action is not completely understood, but the gelling agent may be described in terms of the ratio of boron oxide to phosphorous oxide. The prior art ascribes gelation to the formation of boron phosphate ($BPO_4$) which is prepared by the reaction of equimolar amounts of boric oxide and phosphorous pentoxide as illustrated in the following equation:

(1) 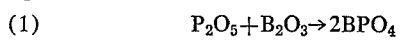 $$P_2O_5 + B_2O_3 \rightarrow 2BPO_4$$

In this equation, phosphorus pentoxide is shown as the reduced formula $P_2O_5$ although it is understood that it is more recently customary to designate the phosphorus pentoxide by the empirical formula $P_4O_{10}$. The actual prior art reference is to the reaction shown in Equation 2 following:

(2) 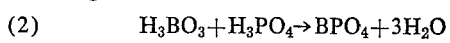 $$H_3BO_3 + H_3PO_4 \rightarrow BPO_4 + 3H_2O$$

Since the reaction of Equation 2 takes place in concentrated or fuming sulfuric acid, dehydration of the acids probably occurs or at least the reaction progresses rapidly by virtue of the removal of water by the dehydrating effect of sulfuric acid.

While the prior art ascribes the gelation to the formation of the compound $BPO_4$, it has been found that gels can be prepared when a deficiency (with respect to phosphorus oxide) of boron oxide is used, but that more stable gels are obtained when a molar excess of boron calculated as the oxide (boric anhydride) is used. Broadly, the amount of boron calculated as $H_3BO_3$ may range from about 3.5 to 12 moles per 100 moles of sulfuric acid and phosphorus calculated as $H_3PO_4$ from 1 to 5 moles per 100 moles of sulfuric acid ($H_2SO_4$). Preferably the boron ranges from 5 to 9 moles and most preferably from 5 to 7 moles per 100 moles of $H_2SO_4$. The phosphorus is preferably from 1 to 3 and most preferably from 1.5 to 2.5 moles per 100 moles of $H_2SO_4$. Boron and phosphorus are both calculated as described above ($H_3BO_3$ and $H_3PO_4$ respectively).

More specifically, FIG. 1 of the attached drawing is a series of graphs which illustrate the ratios of the boron and phosphorus in terms of moles of sulfuric acid. The area bounded by the lines interconnecting the points in the figure A, B, C, D, E is the broadest; the area bounded by the lines interconnecting the figure F, G, H, I is preferred and the figure J, K, L, M is the most preferred. In each case the concentration values within the areas bounded by the above noted graphical figures are within the limits established for gels manufactured in accordance with this invention. The graph illustrated in FIG. 1 is obtained by plotting the points on a set of Cartesian coordinates wherein the abscissa is the number of moles of $H_3BO_3$ per 100 moles of sulfuric acid and the ordinate is the moles of $H_3PO_4$ per 100 moles of sulfuric acid. The points and their coordinates are as follows:

| Point | Moles $H_3PO_4$/100 moles $H_2SO_4$ | Moles $H_2BO_3$/100 moles $H_2SO_4$ |
| --- | --- | --- |
| A | 1 | 4 |
| B | 1.75 | 3.5 |
| C | 5 | 7 |
| D | 5 | 12 |
| E | 1 | 12 |
| F | 1 | 5 |
| G | 3 | 5 |
| H | 3 | 9 |
| I | 1 | 9 |
| J | 1.5 | 5 |
| K | 2.5 | 5 |
| L | 2.5 | 7 |
| M | 1.5 | 7 |

While the values for boron and phosphorus are calculated as the ortho acids, it will be appreciated that such may not exist in the dehydrating environment of sulfuric acid and as such are used for calculation purposes.

Boron oxide used alone does not have a gelling effect so that the excess boron oxide could not be considered as a sole gelling agent acting in conjunction with $BPO_4$ as shown in Equation 3:

(3) $\qquad 2B_2O_3 + P_2O_5 \rightarrow 2BPO_4 + B_2O_3$ or in reduced terms, in Equation 4:

(4) $\qquad B_2O_3 + \tfrac{1}{2} P_2O_5 \rightarrow BPO_4 + \tfrac{1}{2} B_2O_3$ In any event, the higher ratios of boron in the gelling agent produce firmer gels. The use of more than 5 moles of $H_3PO_4$ per 100 moles of sulfuric acid results in excessive "treeing" of lead when the gel is used to form an electrolyte used in a lead-acid battery. The values were also established by the requirement to produce a gel that has good thermal and physical stability and that exhibits less than about 1% syneresis on prolonged storage.

Experience has shown that gelling takes place very rapidly at elevated temperatures, especially when using a concentrated acid, i.e., 98% sulfuric acid, and relatively high proportions of gelling agent, in respect to sulfuric acid. It can be appreciated that various boric acids or phosphoric acids may be conventionally used as a source of boron oxide to form the postulated compound $BPO_4$. Both ortho and meta boric acid are commercially available as well as the boric anhydride or boron oxides which may also be employed. Salts of these borates or metaborates, such as sodium salts, may also be used, if desired. The major limitation on the use of salts is the introduction of undesirable cations which could interfere with battery operation. Accordingly, salts of boron acids containing cations which do not interfere with the electrochemical reactions of the lead-acid type battery are preferred.

The oxides of phosphorus are available in the form of various acids, such as hypophosphorus acid, phosphorus acid, hypophosphoric acid, orthophosphoric acid, metaphosphoric acid, and pyrophosphoric acid. The most preferred of these compounds is the orthophosphoric acid, ordinarily commercially available at an 85% concentration. The oxides, such as phosphorus pentoxide and phosphorus trioxide may also be used, of which phosphorus pentoxide ($P_2O_5$ or $P_4O_{10}$) is the most preferred.

In another preferred embodiment of this invention, the boron phosphate gelling agents are used in conjunction with other gel forming materials, such as silica gel, to produce sulfuric acid solutions with very low concentrations of phosphoric acid component. As an example, a satisfactory gel was prepared with a $$0.4\text{-}H_3PO_4/5\text{-}H_3BO_3/100\text{-}H_2SO_4$$

mole ratio which was incorporated with 2% of a high surface area $SiO_2$ product.

This invention further relates to the use of gelled sulfuric acid which may be diluted in situ in a dry charge lead-acid type battery to form a battery electrolyte. The typical dry charge battery is fabricated with formed (or charged) plates. The cathode is a plate of pure sponge lead and the anode of lead dioxide. The gelled sulfuric acid is maintained in the dry charged battery separated from the plates. Contact of the plates with concentrated sulfuric acid results in destruction of the plate. The battery is activated by admixing with water to form a dilute sulfuric acid electrolyte of the desired specific gravity, i.e., about 1.250.

The present invention also relates to a dry charged battery wherein the concentrated sulfuric acid gel is compartmentalized in the battery case. By virtue of the high sulfuric acid concentrations attainable in the gels and especially in those instances where the sulfuric acid used is oleum containing a high percentage of free $SO_3$, the sulfuric acid portion of the electrolyte can be stored in a minimum of space. In the most preferred instances, the gel is maintained in the case at the sides or above the battery plates.

The invention further relates to the use of the above described gels to form a battery electrolyte by the addition of water thereto prior to placement in a dry charge or other battery. The shipment of the gels and formation of the electrolyte at the point of use has the advantage of ease of handling and reduced hazard to personnel as well as the advantage of shipping a concentrated form of sulfuric acid containing little or no water.

BRIEF DESCRIPTION OF THE DRAWINGS

For a more complete understanding of the invention, reference is made to the attached drawings wherein:

Referring to FIGS. 2, 3 and 4 of the drawings, there is illusrtated a container 10 formed of plastic material resistant to sulfuric acid such as polyethylene, polypropylene fluorinated olefin polymers or the like. As illustrated in FIG. 2 the container has a bottom 12 side provided with a plurality of perforations or holes 14, end walls 16 and side walls 18. A pair of indentations 20 and 20A and step 21 are provided to accommodate the high voltage strap or intercell connector 22 (shown in FIG. 4). The connectors are described in U.S. Pat. No. 3,313,658.

Figure 4:
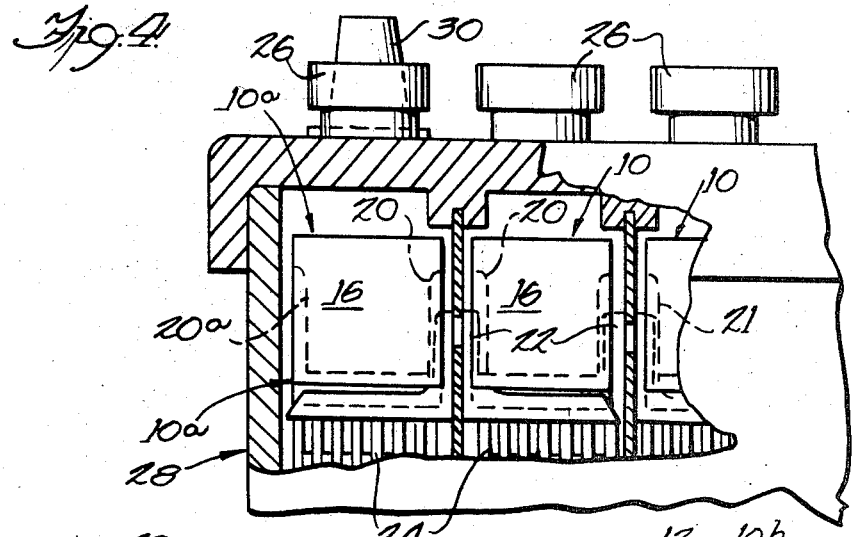
FIG. 4 is an end view of the container illustrated in FIGS. 2 and 3 installed in a battery which latter is illustrated as a fragmentary end view in partial section.

As may also be seen in FIG. 4, container 10 is located over the plates 24 and under the caps 26 of the battery 28. The container identified as 10A would in ordinary use be slightly modified to accommodate the terminal 30 affixed to the end cell. In use the container 10 would contain the sulfuric acid gel and when the battery is to be activated, water is poured into the container through caps 26 and mixed with the gel to form an electrolyte which would flow through the perforations 14.

Figure 2:
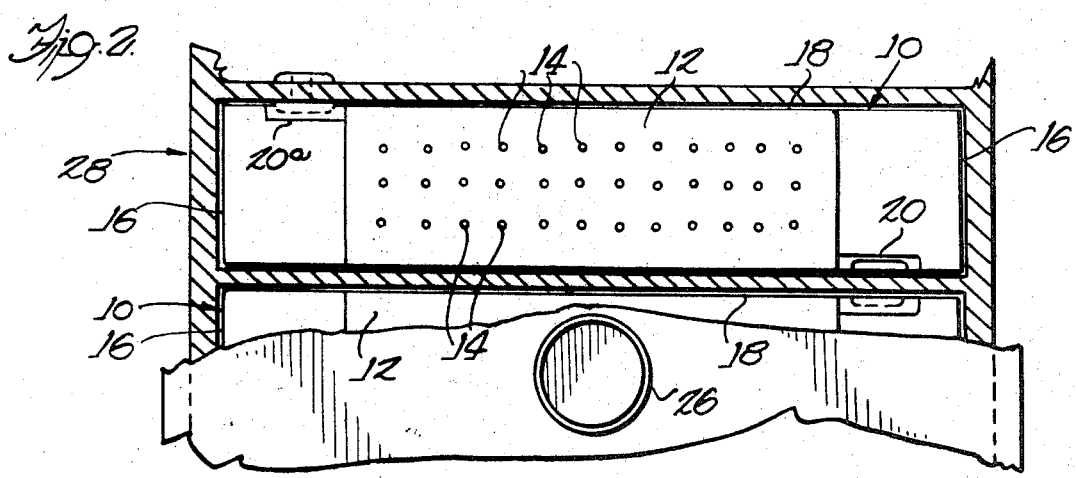
FIG. 2 is a top plan view of a container mounted above the plates mounted in a battery which is shown in fragmentary partial section, with a part of the top case broken away.
Figure 3:
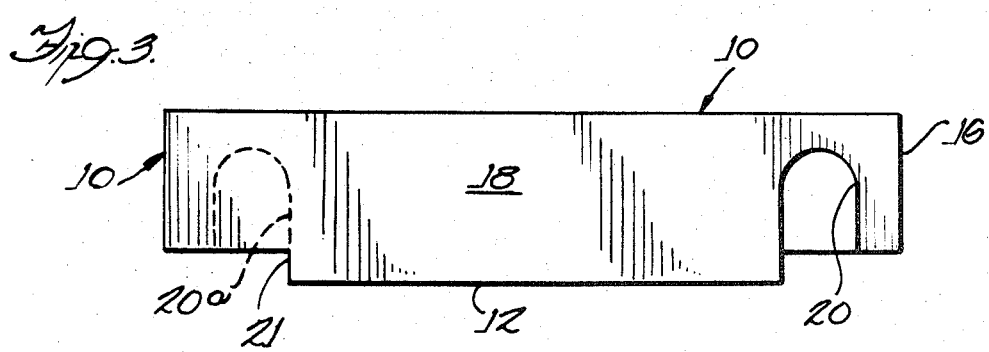
FIG. 3 is a side elevation of the container shown in FIG. 2.
Figure 5:
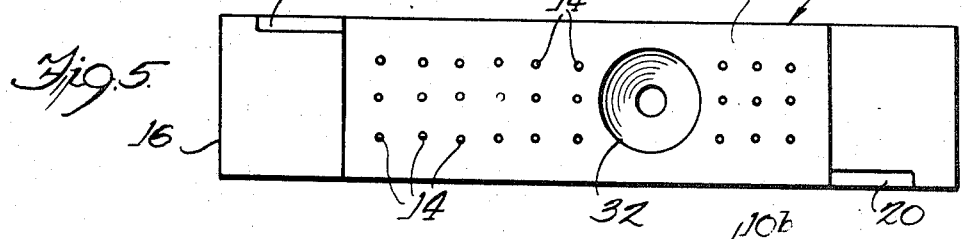
FIGS. 5 and 6 respectively, are top plan and side views of an alternate embodiment of the container illustrated in FIGS. 2–4.
Figure 6:
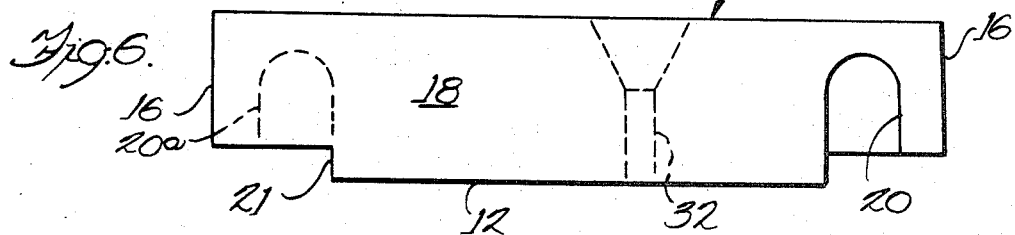

FIGS. 5 and 6 show an alternative form of container 10B in all respects the same as container 10 illustrated in FIGS. 2–4, except for a funnel structure 32 which would permit water to "flood" the container 10B through the bottom perforations 14 and on mixing with the gel form an electrolyte which would pass out through the perforations 14. It should be recognized that the heat evolved and the specific gravity of the electrolyte formed produce currents of solution which aid in the rapid production of a uniform electrolyte solution.

Figure 7:
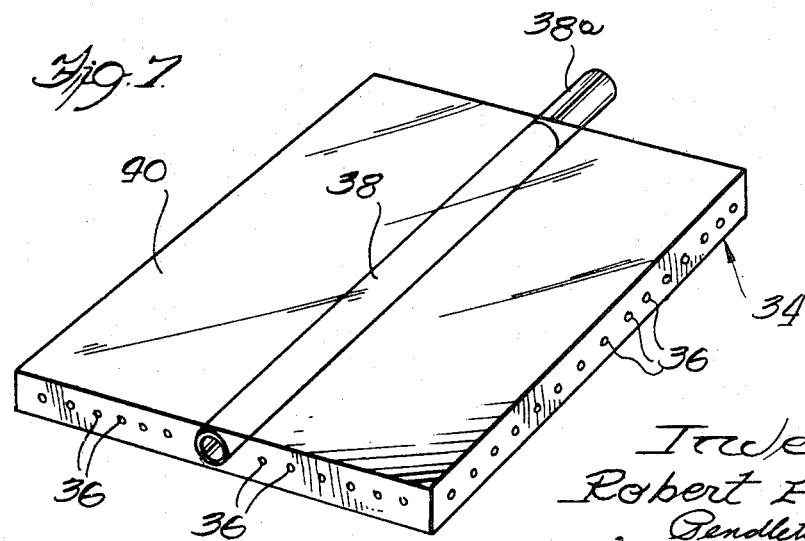
FIG. 7 is a perspective view of a further embodiment of a container used for side mounting alongside the plates at the ends of a battery case.

FIG. 7 illustrates a further embodiment comprising a bag or container 34 which contains a slab of sulfuric acid in the gelled state. The bag has no particular structural form since the slab of gelled sulfuric acid has sufficient rigidity to retain its slab-like shape. A plurality of perforations 36 are provided in the bag to permit ready escape of the electrolyte from the bag after the gel has been mixed with water. The perforations may be placed in the bag randomly and should be of such size that the viscosity of the gel would essentially preclude flow through the perforations. A dissolution and support tube 38 is also shown. This tube extends from the top to the bottom of the container 34 and is preferably formed of microporous polyethylene through which water readily passes. The containerized sulfuric acid gell in container 34 is installed in a conventional battery case, preferably at the ends thereof and having its broader surface 40 parallel to the plates in the battery. The upper end 38A of tube 38 extends to the top of the battery case and water is introduced into the tube at the time the battery is activated for use to form the sulfuric acid electrolyte by mixing with the gel. It should be understood that a part of the required gel volume may also be placed in the mud space of conventional batteries. Furthermore, the gel may be cut from a slab and placed in the containers or trays, or may be formed in situ by adding the gelling agents to the sulfuric acid. A suitable frame is required to hold the sulfuric acid in the perforated containers during the time the gelation is taking place.

DESCRIPTION OF THE PREFERRED EMBODIMENTS

The following specific examples will illustrate preparation of sulfuric acid gels in accordance with the herein described invention.

Example 1

To prepare a gel with a mole ratio of 1.4-$H_3PO_4$/4.0-$H_3BO_3$/100-$H_2SO_4$ and a calculated gelled $H_2SO_4$ content of 99.5% ($SO_3$ and $H_2O$ only), 3,644 g. of 96% $H_2SO_4$ was mixed with 3,293 g. of 29% oleum. 177 g. of boric acid crystals were then dissolved in the major part of the acid mixture and 115.3 g. of 85% phosphoric acid solution added to the remainder of said mixture. The two solutions were then combined and mixed thoroughly. The resulting solution set to a firm gel after about 10 hours at 80° C.

Example 2

To prepare a gel with a 2.0-$H_3PO_4$/5-$H_3BO_3$/100-$H_2SO_4$ mole ratio and a calculated $H_2SO_4$ content of 99.5%, 2,231 g. of 96% $H_2SO_4$ was mixed with 2,593 g. of 29% oleum. 155 g. of boric acid was dissolved in the major portion of this acid and 115.3 g. of phosphoric acid was mixed with the remainder of said acid mixture. The two solutions are then combined and mixed thoroughly. The resulting solution set to a firm gel after about 2 hours at 80° C.

Example 3

To prepare a gel with a mole ratio of 1.0-$H_3PO_4$/7.0-$H_3BO_3$/100-$H_2SO_4$ and a calculated gelled $H_2SO_4$ content of 99.5%, 4,769 g. of 96% $H_2SO_4$ was mixed with 4,909 g. of 29% oleum. 433 g. of boric acid was dissolved in the major portion of this mixture and 115.3 g. of 85% phosphoric acid solution added to the remainder of said mixture. The two solutions were mixed thoroughly before setting at an elevated temperature.

Example 4

To prepare a 3.0-$H_3PO_4$/5.0-$H_3BO_3$/100-$H_2SO_4$ mole ratio gel with a calculated gelled $H_2SO_4$ content of 98.0%, 1,859 g. of 96% $H_2SO_4$ was combined with 1,393 g. of 29% oleum. 115.3 g. of boric acid crystals were dissolved in the major portion of this mixture and 115.3 g. of 85% $H_3PO_4$ solution was added to the remainder of said mixture. These two solutions were then combined and thoroughly mixed.

Example 5

To prepare a gel with a 2-$H_3PO_4$/9-$H_3BO_3$/100-$H_2SO_4$ mole ratio and a calculated gelled $H_2SO_4$ content of 99.5%, 1,932 g. of 96% $H_2SO_4$ was combined with 2,862 g. of 29% oleum. 276.8 g. of boric acid crystals were dissolved in one portion of this mixture and this portion was then thoroughly mixed with the remaining portion to which 115.3 g. of 85% $H_3PO_4$ had been added.

Example 6

A test was performed to compare the initial low temperature, high discharge rate capability of a 12 volt 60 amp-hour dry charge battery containing a gel in accordance with this invention activated by the addition of water and an identical dry charge battery activated by the addition of conventional sulfuric acid electrolyte. Gel, which had a composition equivalent to approximately 3.5 moles of $H_3PO_4$ and 5 moles of $H_3BO_3$ per 100 moles of $H_2SO_4$ (calculated to be 98%), was placed in all six cells of one battery in tray arrangements substantialy the same as that shown in FIGS. 2–4. The batteries were cooled to 29° F. prior to the activation test. Sufficient water, at a temperature of approximately 34° F., was added to each cell containing the gel to produce approximately 888 cc. of electrolyte therein. Approximately 888 cc. of conventional sulfuric acid electrolyte, at a temperature of 29° F., having a specific gravity of 1.270 at 80° F. was added to each cell of the other battery. After being allowed to stand for 20 minutes at room temperature, the batteries were discharged at 150 amps and the voltage levels at different time intervals are shown in Table I. The average temperature of the water-activated, gelled electrolyte was 157° F., whereas the average temperature of the conventional electrolyte was 38° F., after the 20-minute stand.

TABLE I

| Electrolyte | Voltage level at various time intervals | | | | | | | Time to 6 volts, min. |
|---|---|---|---|---|---|---|---|---|
| | 5 sec. | 1 min. | 2 min. | 3 min. | 4 min. | 6 min. | 8 min. | |
| Conventional | 10.05 | 9.68 | 9.27 | 7.85 | | | | 3.31 |
| Gel | 10.56 | 10.49 | 10.38 | 10.28 | 10.17 | 9.81 | 7.62 | 8.75 |

From these test results, it can be seen that a water-activated battery utilizing a gel in accordance with this invention has a far superior initial high rate discharge capability, i.e., the water-activated battery remained at a significantly higher voltage level for a substantially longer time. In fact, the temperature after initial water activation is substantially higher so that the boost charge now required when a dry charge battery is initially activated with a conventional electrolyte can be eliminated.

Example 7

Sulfuric acid gels with varying proportions of $H_3PO_4$ and $H_3BO_3$ were prepared in glass sample bottles. The bottles were tightly capped and placed in an oven at 80° C. for varying periods of time to simulate extended storage periods at room temperatures. The gels were observed for syneresis, i.e., the amount of free liquid exudate which accompanies the gel contraction. The amount of free liquid observed for the various gel compositions, expressed as the approximate percentage of the remaining gel volume, is shown in Table II.

TABLE II

| Run No. | Gel composition $H_3PO_4/H_3BO/H_2SO_4$, moles | No. of Days at 80° C. | Syneresis, amount of liquid exudate, percent of gel volume |
|---|---|---|---|
| 1 | 0.4/6/100 | 62 | 30 |
| 2 | 0.6/8/100 | 61 | 5 |
| 3 | 1/4/100 | 70 | 1 |
| 4 | 1/5/100 | 50 | None |
| 5 | 1/7/100 | 44 | None |
| 6 | 1/9/100 | 91 | 1 |
| 7 | 1.8/3.5/100 | 21 | 1 |
| 8 | 2/2.6/100 | 43 | 10 |
| 9 | 2/9/100 | 45 | None |
| 10 | 3/3/100 | 60 | 50 |
| 11 | 3/3.9/100 | 43 | 10 |
| 12 | 3.5/6/100 | 42 | 1 |
| 13 | 4/4/100 | 3 | 10 |
| 14 | 5/6/100 | 88 | 2 |
| 15 | 4/6/100 | 90 | None |
| 16 | 5/7/100 | 81 | 1 |

As discussed above, a syneresis of 1% or less is desired for a gel to be used in a battery because any appreciable accumulation thereof can result in the liquid exudate, which is concentrated sulfuric acid, contacting the plates and/or separators with resultant severe degradation. From the above test results it can be seen that there are definite critical limitations on the range of $H_3PO_4$ and $H_3BO_3$ mol proportions in order to obtain a gel having an acceptable thermophysical stability. Furthermore, it can be seen that gels made from equal molecular proportions of $H_3PO_4$ and $H_3BO_3$ (Runs 10 and 13) and those having a 30% excess of $H_3BO_3$ (Runs 8 and 11), as disclosed by the Leicester reference, exhibit excessive syneresis thereby making them unacceptable for usage in a water-activated battery.

Example 8

Several 12 volt batteries having a 60 amp-hour rating were subjected to discharge tests to compare performance between batteries utilizing conventional sulfuric acid electrolyte and identical batteries utilizing various gel compositions, which had been dissolved in water prior to placement in the batteries to give an equivalent quantity of sulfuric acid. These tests were performed substantially in accordance with SAE Standard Test for Storage Batteries, SAE J537c. After an initial 80° F. activation test, the batteries were subjected to three discharge tests whereby they were all discharged at 3 amps to a voltage equivalent to 1.75 volts per cell (10.5 volts). The amp-hour ratings of these batteries for the three discharge tests are shown in Table III.

TABLE III

| Run No. | Gel composition $H_3PO_4/H_3BO_3/H_2SO_4$, mole ratio | Amp. hr. rating (discharged at 3 amp. to 10.5 volts) | | |
|---|---|---|---|---|
| | | 1st dischrg. | 2nd dischrg. | 3rd dischrg. |
| 1 | Control | 62.8 | 71.6 | 73.8 |
| 2 | 1/5/100 | 65.6 | 71.1 | 69.5 |
| 3 | 1.5/5/100 | 62.8 | 68.7 | 71.2 |
| 4 | 2/5/100 | 61.6 | 68.0 | 69.1 |
| 5 | 2.5/5/100 | 62.1 | 65.7 | 66.4 |
| 6 | 3/5/100 | 61.6 | 64.8 | 65.1 |
| 7 | Control | 59.3 | 60.2 | 64.2 |
| 8 | 4/5/100 | 55.6 | 56.7 | 57.4 |
| 9 | Control | 61.9 | 64.3 | 63.6 |
| 10 | 5/8/100 | 55.8(7%) | 57.0(5%) | 56.1 |
| 11 | 6/8/100 | 53.1(11.6%) | 54.4 | 33.7 |

In order to minimize performance variations between different batches of batteries, tests were run on a control battery from each batch. The batteries for runs 1 through 6 were from a common batch, batteries for runs 7 and 8 were from a common batch and batteries for runs 9 through 11 were from a common batch.

From these tests, it can be seen that batteries using gel compositions containing up to 5 moles $H_3PO_4/100$ moles of $H_2SO_4$ exhibit amp-hour ratings equal to or only slightly less than those using conventional sulfuric acid electrolyte. Also, it can be seen that the battery using a gel having 6 moles $H_3PO_4/100$ moles $H_2SO_4$ exhibited severe performance degradation during the third discharge cycle. This battery was examined and found to have excessive "lead treeing."

Batteries using gel compositions of this invention have been found to exhibit a minor degradation in cycle life performance, generally less than 10%, when compared to those using conventional sulfuric acid electrolyte. However, batteries having the gel-prepared electrolyte of this invention have a significant reduction in the amount of active material shedding, especialy on the positive plate, and a reduced amount of permanent sulfation normally encountered in the positive plate. As the apparent result of these beneficial effects, batteries using gels of this invention have been found to have an overcharge life, when subjected to standard SAE overcharge life tests, of up to 1.5 times longer than batteries using conventional sulfuric acid electrolyte. These latter advantages more than balance the minor degradation in cycle life performance.

Figure 1:
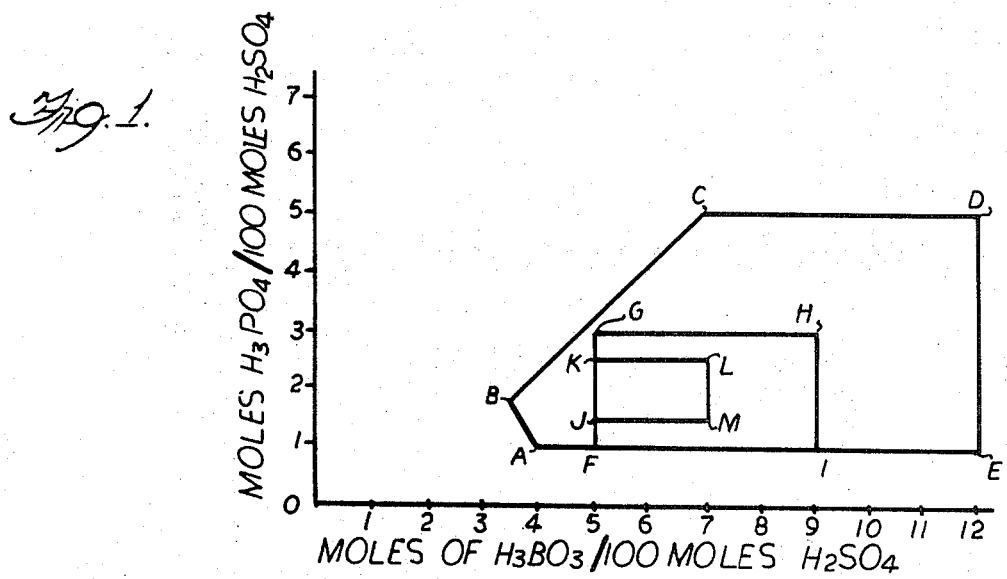
FIG. 1 is a graph illustrating the various concentrations of boron and phosphorus used in forming the sulfuric acid gels of this invention, as previously described.

Is should be understood that while reference is made to gels using certain oxy-acids of boron and phosphorus as gelling agents and the graph FIG. 1 establishes the ratios of the particular acids $H_3BO_3$ and $H_3PO_4$ per 100 moles of sulfuric acid, it is intended that the anhydride equivalent of these or other oxy-acids be considered as fully operative in this invention.

It should be noted that the dry charged lead-acid battery containing a sulfuric acid gel, alleviates one of the problems of the prior art, namely residual moisture in the negative plates. It has been found that the gel placed in a dry charged battery acts to remove moisture from the atmosphere of the battery case and at the same time to remove residual moisture in the battery plates.

While a number of specific embodiments are shown, it should be understood that various other embodiments may be used without departing from the teachings of the invention.

I claim:

1. A geled sulfuric acid comprising sulfuric acid and a gelling agent, said gelling agent is the reaction product of oxy-acids of boron and phosphorus or their anhydride equivalents, said reaction product being present in a concentration on a 100 mole sulfuric acid basis which falls within the area defined by straight lines interconnecting the points A, B, C, D and E in that order, in FIG. 1 of the attached drawing.

2. A dry charged lead-acid battery comprising a case, a lead dioxide positive plate, a sponge lead negative plate and a gel as defined in claim 1, maintained separated from the plates.

3. A composition according to claim 1 wherein the concentration of gelling agent is established by lines interconnecting the points F, G, H and I of FIG. 1 of the attached drawing.

4. A composition according to claim 1 wherein the concentration of gelling agent is established by lines interconnecting the points J, K, L and M of FIG. 1 of the attached drawing.

5. A gel according to claim 1 which is characterized by physical and thermal stability over extended periods of time and exhibiting 1% or less syneresis.

6. In a dry charged lead-acid battery, the improvement which comprises maintaining highly concentrated gelled sulfuric acid compartmentalized and separated from the plates of said battery said gelled sulfuric acid containing as a gelling agent the reaction product of a boron and phosphorous oxide as defined in claim 1.

7. A dry charge lead-acid battery which comprises a case, dry charged battery plates of lead dioxide and sponge lead located in the case, a compartment for maintaining a sulfuric acid gel separated from the plates while the sulfuric acid is in the gel state, and a sulfuric acid gel according to claim 1 in said compartment, said battery being activatable by the addition thereto of water to dissolve said gel and form a sulfuric acid battery electrolyte, the dissolution of said gel permitting the thus formed electrolyte to pass from the compartment for holding the gel to contact the battery plates and form an activated battery.

8. A battery according to claim 7 wherein said compartment comprises an elongated rectangular tray type container positioned above the cell plates of said battery including side and end walls, and a bottom wall having a plurality of perforations formed therein.

9. A battery according to claim 8 wherein the compartment is formed of polypropylene.

References Cited

UNITED STATES PATENTS

| | | | |
|---|---|---|---|
| 3,067,275 | 12/1962 | Solomon | 136—157X |
| 3,304,202 | 2/1967 | Sam | 136—6 |
| 3,375,138 | 3/1968 | Mather | 136—86 |
| 3,408,233 | 10/1968 | Parker et al. | 135—153 |

FOREIGN PATENTS

| | | | |
|---|---|---|---|
| 1,033,957 | 6/1966 | Great Britain | 23—105 |

OTHER REFERENCES

Leicester, The Gelling of Concentrated Sulphuric Acid and Oleum, J. Soc. Chem. Ind. (London), vol. 67, pages 433–4 (1948).

DONALD L. WALTON, Primary Examiner

U.S. Cl.X.R.

23—105; 136—162